United States Patent
Kobayashi et al.

(10) Patent No.: US 11,488,212 B2
(45) Date of Patent: Nov. 1, 2022

(54) SERVER APPARATUS, INFORMATION PROCESSING SYSTEM, STORAGE MEDIUM, MOBILE SHOP, AND METHOD OF OPERATING INFORMATION PROCESSING SYSTEM

(71) Applicant: TOYOTA JIDOSHA KABUSHIKI KAISHA, Toyota (JP)

(72) Inventors: Ryosuke Kobayashi, Nagakute (JP); Ayana Takeshita, Kasugai (JP); Naoki Yamamuro, Nagoya (JP); Takuya Maekawa, Nagoya (JP); Yugo Sakurai, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 42 days.

(21) Appl. No.: 16/996,325

(22) Filed: Aug. 18, 2020

(65) Prior Publication Data
US 2021/0056592 A1     Feb. 25, 2021

(30) Foreign Application Priority Data
Aug. 20, 2019    (JP) .............................. JP2019-150577

(51) Int. Cl.
*G06Q 30/02*     (2012.01)
*G06Q 20/08*     (2012.01)
(Continued)

(52) U.S. Cl.
CPC ........ *G06Q 30/0273* (2013.01); *B60P 3/0255* (2013.01); *B60W 60/0025* (2020.02);
(Continued)

(58) Field of Classification Search
CPC ........... G06Q 30/0273; G06Q 20/0855; G06Q 30/0206; G06Q 30/0272; G06Q 40/02; G06Q 50/28; G06Q 20/12; G06Q 20/208; G06Q 20/308; G06Q 30/0645; G06Q 20/127; B60P 3/0255; B60W 60/0025; G01C 21/343; G09F 21/048; G07F 9/001; G07F 9/002; G07F 11/62
(Continued)

(56) References Cited

FOREIGN PATENT DOCUMENTS

JP     2007-11510 A      1/2007
JP     2015179470 A   *  10/2015

OTHER PUBLICATIONS

Branding (Workshop), The Hidden Costs of Exhibition Marketing & Trade Shows, 2016 (Year: 2016).*

* cited by examiner

*Primary Examiner* — Tarek Elchanti
(74) *Attorney, Agent, or Firm* — Sughrue Mion, PLLC (57) ABSTRACT

A server apparatus and the like that improve operation efficiency of a marketplace for trading products are provided. The server apparatus includes a communication interface, and a controller configured to transmit and receive information to and from another apparatus via the communication interface. The controller calculates a time required until sale of a product at a display position based on a temporal change in captured images of the display position where the product is displayed until the product is sold, determines an exhibition fee for the display position based on the time required, informs a terminal apparatus of an exhibitor of the exhibition fee, and urges the exhibitor to exhibit the product for sale at the display position.

17 Claims, 9 Drawing Sheets

(51) Int. Cl.
- *G09F 21/04* (2006.01)
- *G06Q 50/28* (2012.01)
- *G01C 21/34* (2006.01)
- *B60W 60/00* (2020.01)
- *B60P 3/025* (2006.01)
- *G06Q 40/02* (2012.01)

(52) U.S. Cl.
CPC ....... *G01C 21/343* (2013.01); *G06Q 20/0855* (2013.01); *G06Q 30/0206* (2013.01); *G06Q 30/0272* (2013.01); *G06Q 40/02* (2013.01); *G06Q 50/28* (2013.01); *G09F 21/048* (2013.01)

(58) Field of Classification Search
USPC ....................................................... 705/7.35
See application file for complete search history.

| TIME REQUIRED | LESS THAN 24 HOURS | 10% |
| --- | --- | --- |
| | 24 HOURS OR MORE, LESS THAN 36 HOURS | 8% |
| | 36 HOURS OR MORE, LESS THAN 48 HOURS | 6% |
| | 48 HOURS OR MORE | 5% |

FIG. 9

| | WALL SURFACE | REAR SIDE OF DISPLAY RACK | FRONT SIDE OF DISPLAY RACK |
| --- | --- | --- | --- |
| CLOTHES | 1.2 | 0.6 | 1.0 |
| ELECTRIC APPLIANCE | 0.6 | 1.2 | 1.0 |
| MISCELLANEOUS GOODS | 0.8 | 0.6 | 1.2 |

FIG. 10A

| TIME PERIOD | RESIDENTIAL AREA | OFFICE AREA | DOWNTOWN AREA |
|---|---|---|---|
| 10:00-16:00 | 1.2 | 1.0 | 1.0 |
| 16:00-22:00 | 1.4 | 1.2 | 1.2 |

FIG. 10B

| TIME PERIOD | RESIDENTIAL AREA | OFFICE AREA | DOWNTOWN AREA |
|---|---|---|---|
| 10:00-16:00 | 1.2 | 0.6 | 1.4 |
| 16:00-22:00 | 1.4 | 0.6 | 1.2 |

SERVER APPARATUS, INFORMATION PROCESSING SYSTEM, STORAGE MEDIUM, MOBILE SHOP, AND METHOD OF OPERATING INFORMATION PROCESSING SYSTEM

CROSS-REFERENCE TO RELATED APPLICATIONS

The present application claims priority to Japanese patent application No. 2019-150577 filed on Aug. 20, 2019, the entire disclosure of which is incorporated herein by reference.

TECHNICAL FIELD

The present disclosure relates to a server apparatus, an information processing system, a program, a mobile shop, and a method of operating an information processing system.

BACKGROUND

Business forms which provide a marketplace where an exhibitor displays various products and a purchaser can access and purchase displayed products are known. As an example of art supporting provision of a marketplace for trading products, PTL 1 discloses an example of a computer system that supports delivery of products and settlement in an unmanned shop.

CITATION LIST

Patent Literature

PTL 1: JP 2007-011510 A

SUMMARY

For a service provider of a marketplace for trading products, there is room for improving efficiency in providing the marketplace for trading products.

An object of the present disclosure is to provide a server apparatus or the like that improves efficiency in providing a marketplace for trading products.

A server apparatus according to the present disclosure includes a communication interface, and a controller configured to transmit and receive information to and from another apparatus via the communication interface. The controller calculates a time required until sale of a product at a display position based on a temporal change in captured images of the display position where the product is displayed until the product is sold, determines an exhibition fee for the display position based on the time required, informs a terminal apparatus of an exhibitor of the exhibition fee, and urges the exhibitor to exhibit a product at the display position.

A program for a terminal apparatus according to the present disclosure is a program which, when executed by the terminal apparatus, causes the terminal apparatus to, when a time required until sale of a product at a display position is calculated by a server apparatus based on a temporal change in captured images of the display position at which the product is displayed until the product is sold and an exhibition fee for the display position is determined by the server apparatus based on the time required, receive a notification indicating the exhibition fee from the server apparatus, and output the exhibition fee to urge an exhibitor to exhibit a product at the display position.

A program for a mobile shop according to the present disclosure is a program which, when executed by a controller of a mobile shop including a communication interface, a controller configured to transmit and receive information with another apparatus via the communication interface, and a display position where a product is displayed until the product is sold, causes the mobile shop to image the display position using an imager, and transmit a captured image of the display position to a server apparatus that calculates a time required until sale of the product at the display position based on a temporal change in the captured images, wherein an exhibition fee for the display position is determined by the server based on the time required, and a terminal apparatus of the exhibitor is informed of the exhibition fee.

A method of operating an information processing system including a server apparatus, a mobile shop configured to transmit and receive information to and from the server apparatus, and a terminal apparatus, according to the present disclosure, includes: the mobile shop, which includes a display position at which a product is displayed until the product is sold and an imager that images the display position, transmitting captured images of the display position to the server apparatus; the server apparatus calculating a time required until sale of the product at the display position based on a temporal change in the captured images, determining an exhibition fee for the display position based on the time required, and informing the terminal apparatus of the exhibition fee; the terminal apparatus outputting the exhibition fee and urging an exhibitor to exhibit a product at the display position, and transmitting an acceptance of the exhibition fee to the server apparatus in response to an operation by the exhibitor; and by the server apparatus, performing a process of charging the exhibition fee to a financial account of the exhibitor.

According to a server apparatus or the like of the present disclosure, efficiency in providing a marketplace for trading products can be improved.

DETAILED DESCRIPTION

Hereinafter, an embodiment will be described.

Figure 1:
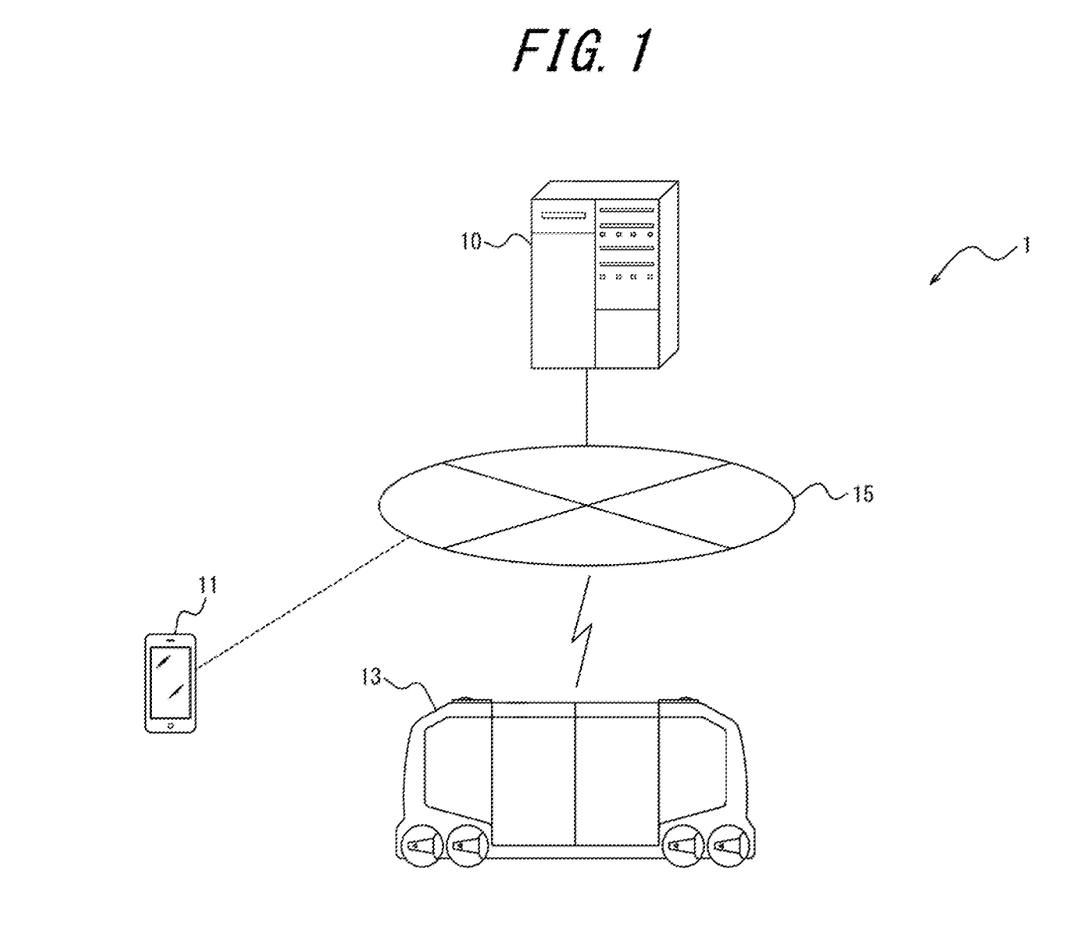
FIG. 1 illustrates an exemplary configuration of an information processing system.

FIG. 1 illustrates an exemplary configuration of an information processing system according to an embodiment. The information processing system 1 supports provision of a marketplace for trading products via a mobile shop. The information processing system 1 includes, for example, at least one server apparatus 10, at least one exhibitor terminal apparatus 11, and at least one mobile shop 13 that are connected and able to communicate information with one another via a network 15. The server apparatus 10 functions as, for example, a server that provides a website of a service provider which operates a marketplace for trading products, and instructs the mobile shop 13 to perform operations such as moving. The exhibitor terminal apparatus 11 is an information processing terminal apparatus to be used by an exhibitor and is, for example, a personal computer, a tablet terminal apparatus, a smartphone, or the like. The mobile shop 13 is, for example, a multipurpose vehicle that can be manually driven or automatically driven in a manned/unmanned state, with shop equipment installed for traveling sales of products. The network 15 is, for example, the Internet, but may include an ad-hoc network, LAN, Metropolitan Area Network (MAN), another network, or any combination thereof.

In the information processing system 1, products are traded as outlined below. When the server apparatus 10 receives an exhibition request from the exhibitor terminal apparatus 11 of an exhibitor who wishes to exhibit a product, the server apparatus 10 informs the exhibitor terminal apparatus 11 of the exhibition fee for an available display position, according to the availability of product display positions in the mobile shop 13, and charges the exhibitor. Then, the server apparatus 10 causes the mobile shop 13 to move to a product collection point designated by the exhibitor to collect the product for exhibition (hereinafter, exhibited product). Then, the mobile shop 13 sells the exhibited product while traveling in a predetermined traveling area. At that time, the mobile shop 13 continuously transmits, to the server apparatus 10, captured images of the display position where the exhibited product is displayed. The server apparatus 10 detects exhibition and sale of the exhibited product from a temporal change in the captured images to thereby derive a time required from exhibition to sale. Then, the server apparatus 10 determines and updates the exhibition fee based on the time required for each display position, at an appropriate time. For example, the server apparatus 10 sets the exhibition fee for a display position where the time required is short, that is, product turnover is high, to be relatively high, and sets the exhibition fee for a display position where the time required is long, that is, product turnover is low, to be relatively low.

When a product is displayed for sale, sale of the product may depend on the position where the product is displayed because the product may easily catch the eye of purchasers or be seen as a "hot" product. The information processing system 1 tracks exhibition and sale of the product by means of captured images to thereby detect product turnover for each display position. Then, by setting the exhibition fee for a display position where turnover is high to be high and setting the exhibition fee for a display position where turnover is low to be low, it is possible to efficiently increase the exhibition fee income of the marketplace service provider. It is also possible to provide a sense of satisfaction to the exhibitor through the tradeoff between the sale of the product being achieved quickly when the exhibition fee is high, whereas sale of the product takes time when the exhibition fee is low.

Figure 2:
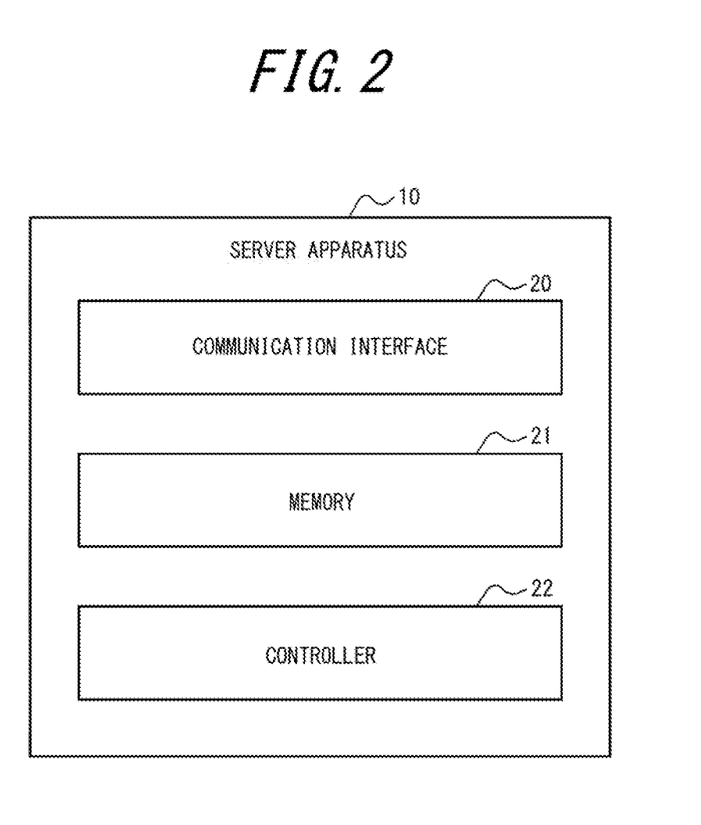
FIG. 2 illustrates an exemplary configuration of a server apparatus.

FIG. 2 illustrates an exemplary configuration of the server apparatus 10. The server apparatus 10 includes a communication interface 20, a memory 21, and a controller 22. The server apparatus 10 may communicate and cooperate with another server apparatus having a similar configuration to perform the operations of the present embodiment.

The communication interface 20 includes one or more communication modules conforming to wired or wireless LAN standards for connecting to the network 15. In the present embodiment, the server apparatus 10 is connected to the network 15 via the communication interface 20.

The memory 21 includes a semiconductor memory, a magnetic memory, an optical memory, or the like, for example. The memory 21 functions as a main memory, an auxiliary memory, or a cache memory. The memory 21 stores, for example, any information, control/processing programs, or the like to be used for operation of the server apparatus 10.

The controller 22 includes, for example, one or more general-purpose processors such as a central processing unit (CPU) or one or more dedicated processors dedicated to specific processing. Alternatively, the controller 22 may include a dedicated circuit such as a Field-Programmable Gate Array (FPGA) or an Application Specific Integrated Circuit (ASIC). The controller 22 collectively controls operation of the server apparatus 10 through operations in accordance with control/processing programs or operations in accordance with operation procedures implemented as circuits. Then, the controller 22 performs operations according to the present embodiment by transmitting and receiving various types of information to and from the exhibitor terminal apparatus 11 and transmitting and receiving various types of information including captured images to and from the mobile shop 13 via the communication interface 20.

Figure 3:
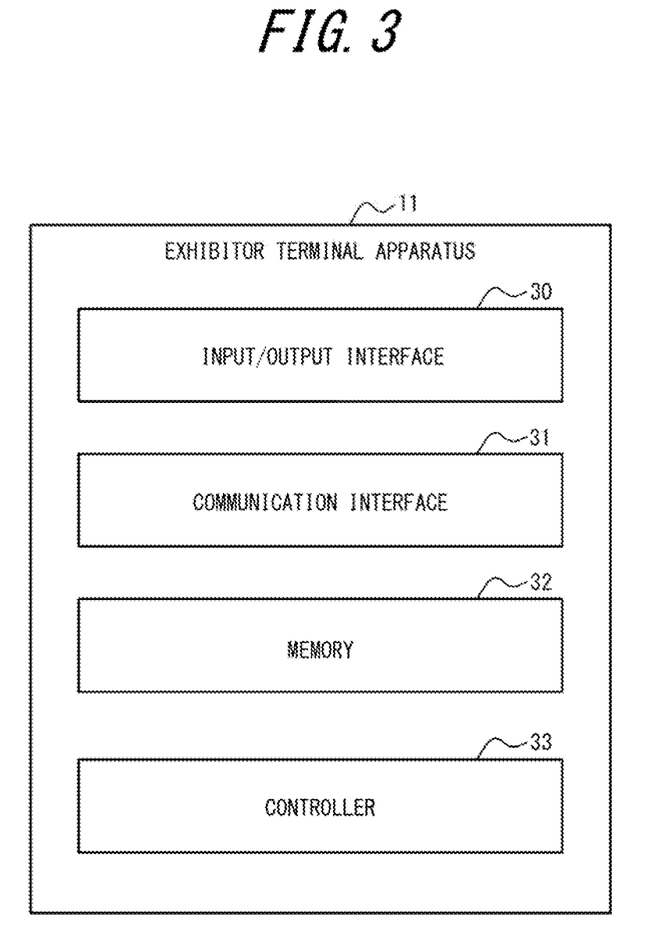
FIG. 3 illustrates an exemplary configuration of a terminal apparatus for exhibition.

FIG. 3 illustrates an exemplary configuration of the exhibitor terminal apparatus 11. The exhibitor terminal apparatus 11 is an information processing terminal apparatus such as a personal computer, a tablet terminal apparatus, or a smartphone, for example. The exhibitor terminal apparatus 11 includes an input/output interface 30, a communication interface 31, a memory 32, and a controller 33.

The input/output interface 30 includes an input interface for detecting an input from a user and transmitting input information to the controller 33. Such an input interface may be any suitable input interface including, for example, physical keys, capacitive keys, a touchscreen integrated with a panel display, various types of pointing devices, a microphone for accepting voice input, a camera for capturing captured images or image codes. The input/output interface 30 also includes an output interface for outputting information generated by the controller 33 and information received from the server apparatus 10, to a user. Such an output interface may be any suitable output interface including, for example, an external or integral display that outputs information as images or videos, a speaker that outputs information as sound, or an interface for connecting to an external output device.

The communication interface 31 includes a communication module conforming to wired or wireless LAN standards, or a module conforming to a mobile communication standard such as the 4th generation (4G) or the 5th generation (5G) standards. The exhibitor terminal apparatus 11 is connected to the network 15 via a router apparatus nearby or a mobile communication base station, and performs information communication with the server apparatus 10 via the network 15, using the communication interface 31.

The memory 32 includes a semiconductor memory, a magnetic memory, an optical memory, or the like, for example. The memory 32 functions as a main memory, an auxiliary memory, or a cache memory, for example. The memory 32 stores any information to be used for operation of the exhibitor terminal apparatus 11. For example, the memory 32 stores control/processing programs, application programs providing various functions to be downloaded via the network 15, and the like.

The controller 33 includes, for example, one or more general-purpose processors such as a CPU or a micro processing unit (MPU), or one or more dedicated processors dedicated to specific processing. Alternatively, the controller 33 may include one or more dedicated circuits such as a FPGA, and an ASIC. The controller 33 collectively controls operation of the exhibitor terminal apparatus 11 through operation in accordance with the control/processing programs or operation in accordance with operation procedures implemented as circuits. Then, the controller 33 performs operations according to the present embodiment by transmitting and receiving various types of information to and from the server apparatus 10 via the communication interface 31.

The mobile shop 13 is a multipurpose vehicle that can be manually operated or automatically operated in a manned or unmanned manner, and can be configured with equipment corresponding to different uses such as sales, lodging, or passenger transportation. In the present embodiment, the mobile shop 13 is provided with shop equipment for traveling sales of products. The shop equipment includes display positions for displaying products. The display positions are subdivided areas or spaces in a display rack or a showcase, or a wall surface with hooks where products can be hooked, for example. Each display position corresponds to a space where it is envisaged that one product can be displayed, and may be different in size. Products to be displayed are tangible objects that can be traded at a shop such as daily goods, miscellaneous goods, books, clothes, and electric appliances, for example. The display positions are arranged such that each product to be displayed is displayed so as not to be covered by another product and such that at least part of each product can be seen. The mobile shop 13 moves to a collection point designated by the exhibitor whereby the exhibited product is collected at each collection point and is displayed. The mobile shop 13 may also move to a base of the service provider of the marketplace for trading products, whereby exhibited products sent by the exhibitor to the base separately may, to a certain extent, be loaded and displayed collectively.

Figure 4:
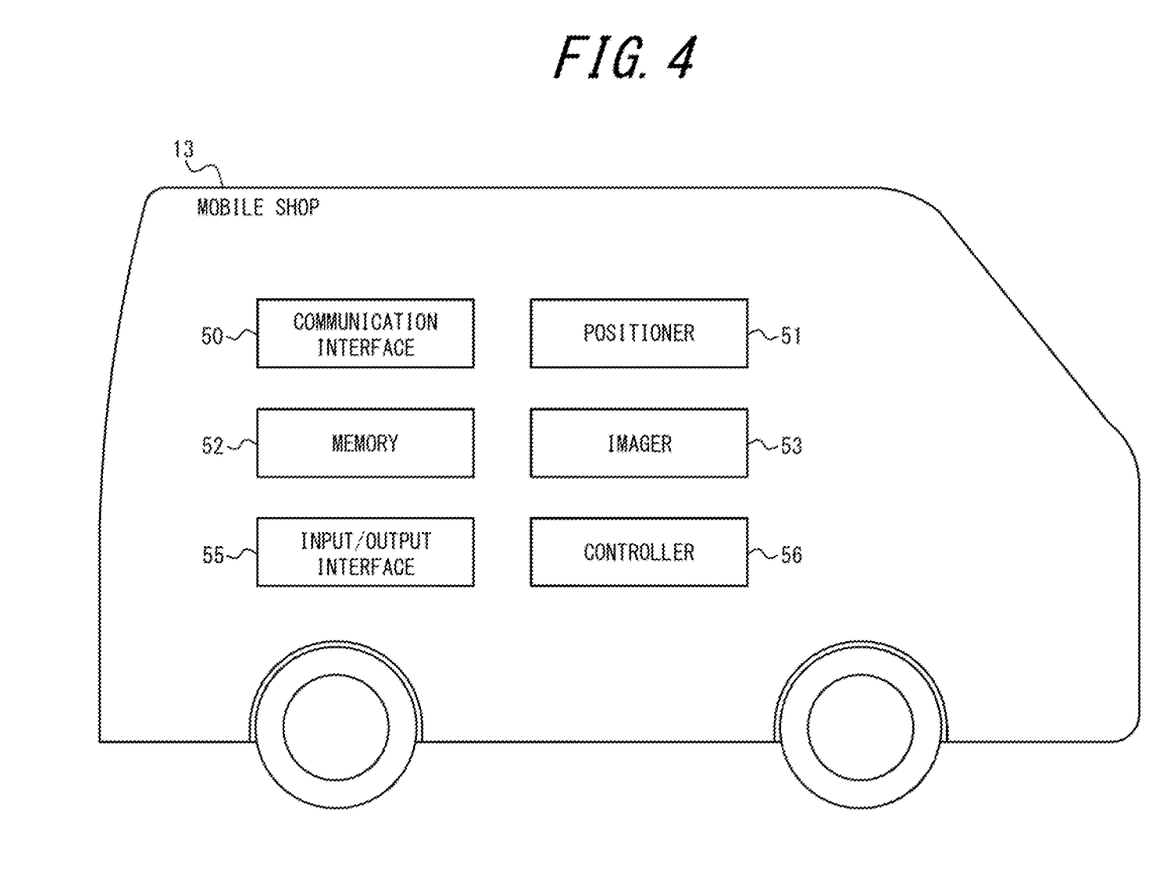
FIG. 4 illustrates an exemplary configuration of a mobile shop.

FIG. 4 illustrates an exemplary configuration of the mobile shop 13. The mobile shop 13 includes a communication interface 50, a positioner 51, a memory 52, an imager 53, an input/output interface 55, and a controller 56. The respective interfaces are communicably connected with each other in a wired or wireless manner via an on-vehicle network such as a controller area network (CAN) or a dedicated network. Some or all of the communication interface 50, the positioner 51, the memory 52, the imager 53, the input/output interface 55, and the controller 56 may be directly provided to the mobile shop 13, or may be provided to an information processing apparatus attachable to and detachable from the mobile shop 13, such as a car navigation apparatus. The mobile shop 13 may be driven by a driver or driven automatically at an appropriate level. The level of automatic driving may be any of levels 1 to 5 as defined by the Society of Automotive Engineers (SAE), for example.

The communication interface 50 includes a communication module conforming to wired or wireless LAN standards, or a module conforming to a mobile communication standard such as 4G, or 5G. The mobile shop 13 is connected to the network 15 via a mobile communication base station by the communication interface 50, and performs information communication with the server apparatus 10 via the network 15.

The positioner 51 measures the position of the mobile shop 13 and generates position information. The position information is information specifying the position on a map, including coordinates such as two-dimensional coordinates or three-dimensional coordinates, for example. The position information is not limited to coordinates. It may include speed, a moving route, a moving distance, or the amount of change or the rate of change thereof, or the like. The positioner 51 includes a receiver that supports a satellite navigation system. The satellite navigation system supported by the receiver may be the Global Positioning System (GPS), for example. Alternatively, the positioner 51 may include an acceleration sensor, a gyro sensor, or the like. The car navigation apparatus may function as the positioner 51, for example.

The memory 52 includes, for example, a semiconductor memory, a magnetic memory, an optical memory, or the like. The memory 52 functions as a main memory, an auxiliary memory, or a cache memory, for example. The memory 52 stores any information to be used for controlling the operations of the mobile shop 13. For example, the memory 52 stores control/processing programs, application programs providing various functions to be downloaded via the network 15, and the like.

The imager 53 includes one or more cameras and the control circuits thereof, provided at positions from which the display positions in the mobile shop 13 can be imaged. The camera provided to the imager 53 may be a monocular camera or a stereo camera.

The input/output interface 55 includes an input interface for detecting an input from a user and transmitting input information to the controller 56. Such an input interface may be any suitable input interface such as physical keys, capacitive keys, a touchscreen integrated with a panel display, various pointing devices, a microphone for accepting voice input, a camera for capturing captured images or image codes, or any interface which includes an IC card reader, for example. The input/output interface 55 also includes an output interface for outputting information generated by the controller 56 and information received from the server apparatus 10, to a user. Such an output interface is any suitable output interface including, for example, an external or integrated display that outputs information as images or videos, a speaker that outputs information as sound, or an interface for connecting to an external output device.

The controller 56 includes one or more general-purpose processors such as a CPU or an MPU or one or more dedicated processors dedicated to specific processing. Alternatively, the controller 56 may include one or more dedicated circuits such as a FPGA, and an ASIC. The controller 56 collectively controls operations of the mobile shop 13 including the communication interface 50, the positioner 51, the memory 52, the imager 53, and the input/output interface 55, through operations in accordance with control/processing programs or operations in accordance with operation procedures implemented as circuits. Further, the controller 56 performs operations according to the present embodiment by transmitting and receiving various types of information including images captured by the imager 53 to and from the server apparatus 10 and transmitting and receiving various types of information to and from the exhibitor terminal apparatus 11, via the communication interface 50.

Figure 5:
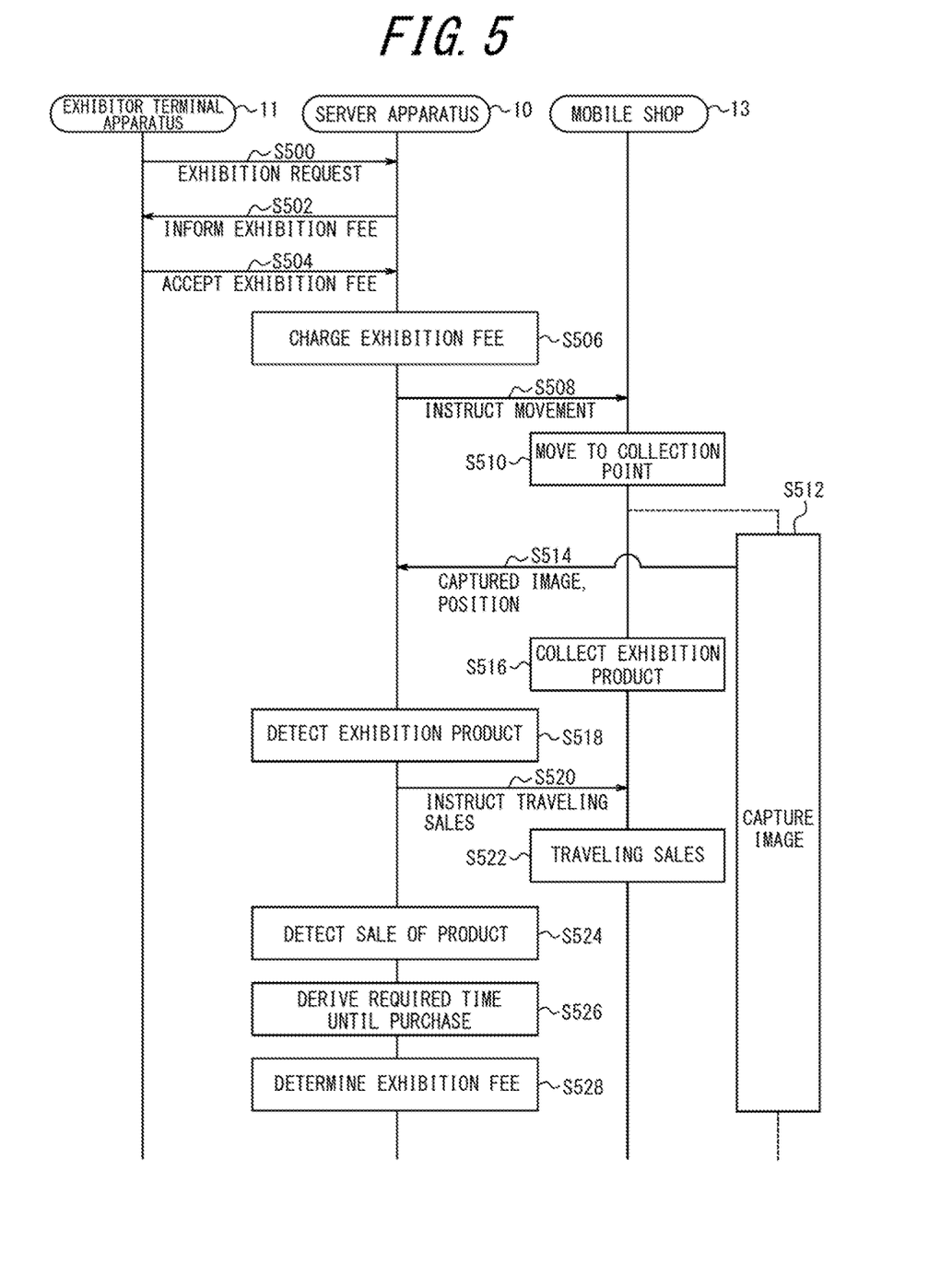
FIG. 5 illustrates operation procedures of an information processing system.

FIG. 5 is a sequence chart illustrating exemplary operations of the information processing system 1 when a product is to be exhibited. FIG. 5 illustrates steps in which the respective controllers of the server apparatus 10, the exhibitor terminal apparatus 11, and the mobile shop 13 transmit and receive information to and from other apparatuses, and perform information processing and control.

When an exhibitor who wishes to exhibit a product operates the exhibitor terminal apparatus 11, the exhibitor terminal apparatus 11 transmits an exhibition request to the server apparatus 10, and the server apparatus 10 receives the exhibition request (step S500). The exhibitor manually inputs the exhibition request from, for example, a touchscreen and instructs transmission. The exhibition request includes product information and exhibitor information. The product information includes, for example, the type of exhibited product, product name, attributes, price, captured images of the product, and the like. The exhibitor information includes identification information for the exhibitor, position information for a collection point for the product designated by the exhibitor, financial account information, and the like. Such information may be transmitted at once to the server apparatus 10 in advance by the exhibitor as membership information for the marketplace site provided by the server apparatus 10, and stored in the memory 21 by the server apparatus 10, or transmitted by the exhibitor terminal apparatus 11 to the server apparatus 10 each time a product is to be exhibited.

Next, the server apparatus 10 informs the exhibitor terminal apparatus 11 of the available display position and the exhibition fee thereof, according to the availability of the display positions in the mobile shop, and urges exhibition of the product (step S502). The server apparatus 10 stores the routes and the schedules of the traveling sales of one or more mobile shops 13 in the memory 21 in advance, for example, and informs the exhibitor terminal apparatus 11 of the exhibition fee for the display position in the mobile shop 13 nearest to the collection point. Here, in selecting the nearest mobile shop 13, it is possible to set a condition that the collection point of the product is within a certain distance range (for example, 2 to 5 km) from the route of the traveling sales, for example. Moreover, it is also possible to set a condition that the delay caused by passing through the collection point is within a predetermined range (for example, one to two hours) with respect to the scheduled end time of the traveling sales. Further, the server apparatus 10 stores a correspondence relationship between exhibited products and display positions for each mobile shop 13, in the memory 21. Furthermore, the server apparatus 10 stores, in the memory 21, exhibition fees for respective display positions of each mobile shop 13, and determines and updates the exhibition fees, at an appropriate time, in accordance with the procedures described below. Then, the server apparatus 10 extracts a display position that is not associated with any exhibited product and is available in the selected mobile shop 13, and informs the exhibitor terminal apparatus 11 of the exhibition fee corresponding to the extracted display position. The server apparatus 10 may inform the exhibitor terminal apparatus 11 of the exhibition fees for a plurality of display positions. Then, the exhibitor terminal apparatus 11 outputs display positions and the exhibition fees thereof to the exhibitor.

When the exhibitor agrees to the exhibition fee, the exhibitor operates the exhibitor terminal apparatus 11 to select the desired display position from the informed display positions, and transmits information indicating agreement to charging of the exhibition fee to the server apparatus 10 (step S504). Then, the server apparatus 10 performs a charging process for the exhibition fee in respect of the exhibitor, based on the financial account information of the exhibitor included in the exhibitor information (step S506).

Next, the server apparatus 10 transmits, to the mobile shop 13, an instruction to move to the collection point for the exhibited product (step S508). Then, under control by the controller 56, the mobile shop 13 moves to the collection point for the product (step S510).

In the mobile shop 13, the imager 53 begins imaging of the display position (step S512), and transmits a captured image and position information at the time of imaging to the server apparatus 10 (step S514). The imager 53 of the mobile shop 13 images the display position at least once from the time when the mobile shop 13 receives a moving instruction from the server apparatus 10 until the time when the mobile shop 13 arrives at the collection point, and transmits the captured image to the server apparatus 10. The imager 53 repeats imaging and transmission of a captured image in a predetermined cycle of ten seconds to twenty minutes, for example.

When the mobile shop 13 arrives at the collection point, the exhibited product is collected (step S516). At the collection point, the exhibited product is displayed at the display position selected by the exhibitor at step S504, by the exhibitor or a crew member of the mobile shop 13. For example, by sending identification information such as a number previously assigned to the display position to the exhibitor terminal apparatus 11 in advance at the timing of charging the exhibition fee by the server apparatus 10, the exhibitor can determine the display position. Then, the exhibitor or a crew member who received the request from the exhibitor places the exhibited product at the display position where it should be placed.

The server apparatus 10 detects the exhibited product from a temporal change in the captured images of the display position from the time before the exhibited product is collected to the time after collection (step S518).

Figure 6A:
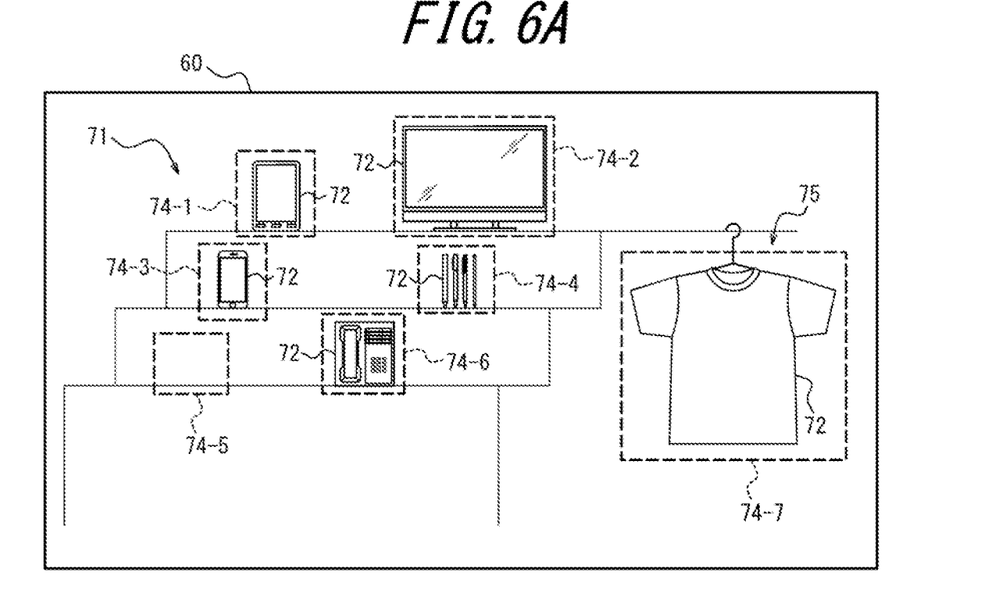
FIG. 6A illustrates an example of a temporal change in captured images.
Figure 6B:
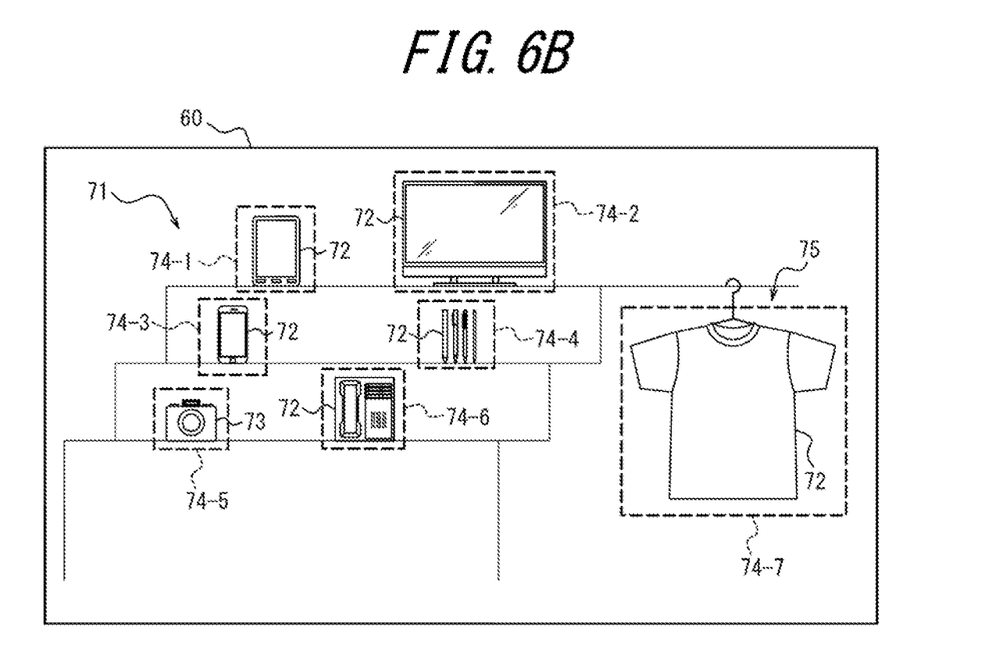
FIG. 6B illustrates an example of a temporal change in captured images.

Here, FIGS. 6A and 6B illustrate an example of a temporal change in captured images. FIGS. 6A and 6B respectively illustrate captured images 60 of the display positions before and after collection of an exhibited product. As illustrated in FIG. 6A, the captured image 60 before collection of the product includes display positions 74-1 to 74-6 on a display rack 71, a display position 74-7 corresponding to a wall surface 75, and products 72 displayed at all of the display positions except for the display position 74-5. On the other hand, as illustrated in FIG. 6B, the captured image 60 after the collection of the exhibited product includes an exhibited product 73 that is newly displayed at the display position 74-5, in addition to the previously displayed products 72. The server apparatus 10 detects the display rack 71, the wall surface 75, the products 72, and the exhibited product 73, through image processing such as edge detection and pattern recognition. The display positions 74-1 to 74-7 are previously mapped on an image of the display rack 71 and the wall surface 75 corresponding to the spaces required for displaying products. Here, as a temporal change in the captured images 60, the newly displayed exhibited product 73 is detected. The server apparatus 10 stores the products detected in the captured image 60 and the display positions thereof in the memory 21 in association with each other.

Referring to FIG. 5 again, the server apparatus 10 transmits an instruction to perform traveling sales to the mobile shop 13 (step S520). Then, the mobile shop 13 begins traveling sales (step S522). The instruction for traveling sales transmitted by the server apparatus 10 includes, for example, a traveling route, position information for a parking or stopping position for sales, a parking or stopping time, a traveling speed, a scheduled arrival time at a predetermined point on the traveling route or the like. Alternatively, these kinds of information may be transmitted once from the server apparatus 10 to the mobile shop 13 before collection of the exhibited product, for example.

The mobile shop 13 performs traveling sales in response to the instruction from the server apparatus 10 (step S522). The mobile shop 13 moves along a preset traveling route in a residential area, a business area, a downtown area, or the like, for example, and is parked or stopped in response to a request from a purchaser or at a preset sales point to perform sales of mounted products. In the case of performing sales in response to a request from a purchaser, the server apparatus 10 informs a terminal apparatus of a purchaser near the traveling route, among the purchasers registered as members in advance, of the scheduled passage of the mobile shop 13. When a purchaser uses a terminal apparatus to request, to the server apparatus 10, parking or stopping of the mobile shop 13, the server apparatus 10 transmits, to the mobile shop 13, an instruction to park or stop at a point designated by the purchaser or a sales point near the purchaser, to cause the mobile shop 13 to park or stop and perform sales. The server apparatus 10 also informs the terminal apparatus of the purchaser of the parking or stopping of the mobile shop 13. In this way, traveling sales is performed by parking or stopping the mobile shop 13 one or more times on the traveling route.

Next, when the mobile shop 13 performs traveling sales, the server apparatus 10 detects that a product is sold from a temporal change in captured images of the display positions (step S524). A purchaser visits the parked or stopped mobile shop 13, and the purchaser or a crew member of the mobile shop 13 responding to a request by the purchaser takes a product desired by the purchaser from the display position. Then, the purchaser pays the purchase amount. Payment is made by cash, a charging process such as a credit card, electronic money, or the like. As a charging process, for example, information necessary for charging is transmitted from the terminal apparatus of the purchaser to the server apparatus 10 directly or via the mobile shop 13, and the server apparatus 10 can perform a charging process on the financial account of the purchaser.

Figure 7A:
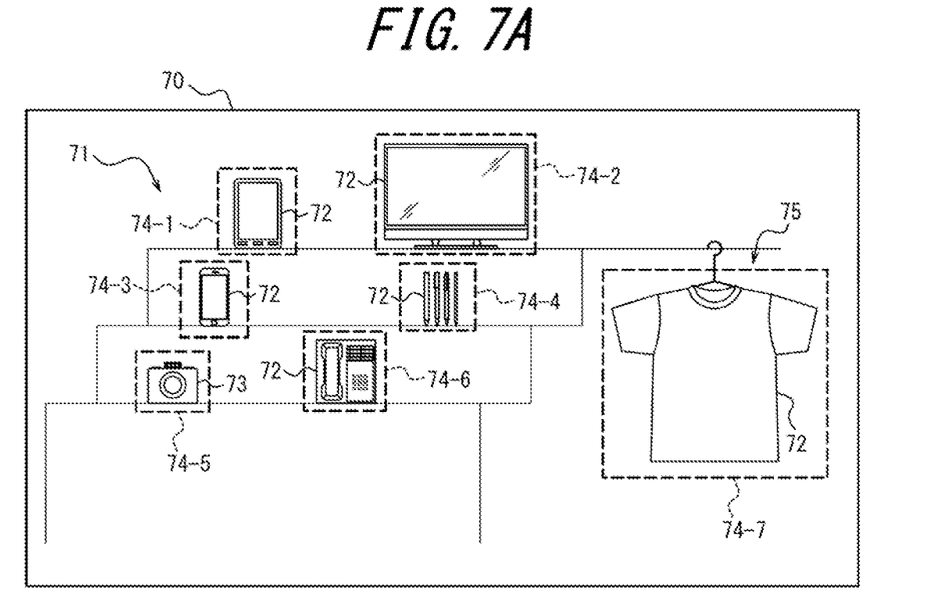
FIG. 7A illustrates an example of a temporal change in captured images.
Figure 7B:
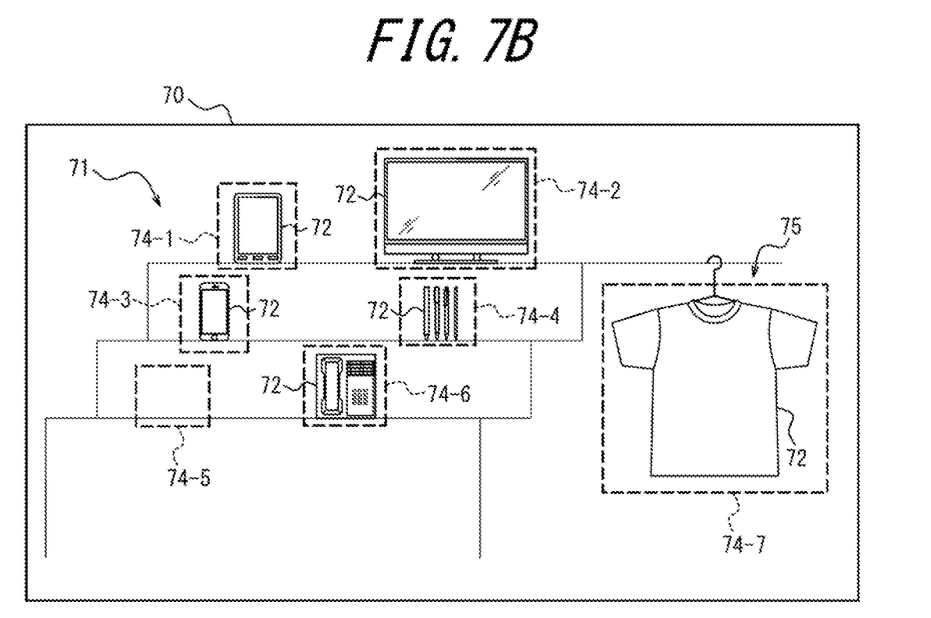
FIG. 7B illustrates an example of a temporal change in captured images.

Here, FIGS. 7A and 7B illustrate an example of a temporal change in captured images. FIGS. 7A and 7B illustrate captured images 70 of the display positions before and after the sale of product. As illustrated in FIG. 7A, in the captured image 70 before the sale of the product, the display positions 74-1 to 74-6 on the display rack 71, the display position 74-7 on the wall surface 75, and the products 72 and the exhibited product 73 displayed on the respective display positions are included. In the captured image 70 illustrated in FIG. 7B, the exhibited product 73 is removed from the display position 74-5. The server apparatus 10 detects that the exhibited product 73 is removed, as a temporal change in the captured images 70. Thereby, the server apparatus 10 detects that the exhibited product 73 has been sold.

Referring to FIG. 5 again, the server apparatus 10 derives the time taken for the sale of the product detected to be sold at step S524 (step S526). For example, the server apparatus 10 detects, using a timing function of the controller 22, the time when the collection of the sold product was detected or the time when an instruction for traveling sales was made to the mobile shop 13, and stores the time in the memory 21. Then, the server apparatus 10 calculates the difference between either of the stored times and the time when the sale was detected, to thereby obtain the time required until sale of the product.

Next, the server apparatus 10 determines the exhibition fee based on the time required for each display position (step S528), and updates the past exhibition fee. When steps S500 to S526 are repeatedly performed, each time a product is exhibited, the product is placed for sale on an available display position, and the exhibited product is eventually sold, and the server apparatus 10 can collect information of the time required for the sale for the display position. The server apparatus 10 accumulates information about the time required for each display position of each mobile shop in the memory 21, and calculates a representative time required for each display position. A representative time required is, for example, an average value, a median value, or the like of the accumulated values of the time required. Then, the server apparatus 10 sets the exhibition fee for a display position where the representative time required is short, that is, product turnover is high, to be relatively high, and sets the exhibition fee for a display position where the representative time required is long, that is, product turnover is low, to be relatively low.

Figure 8:
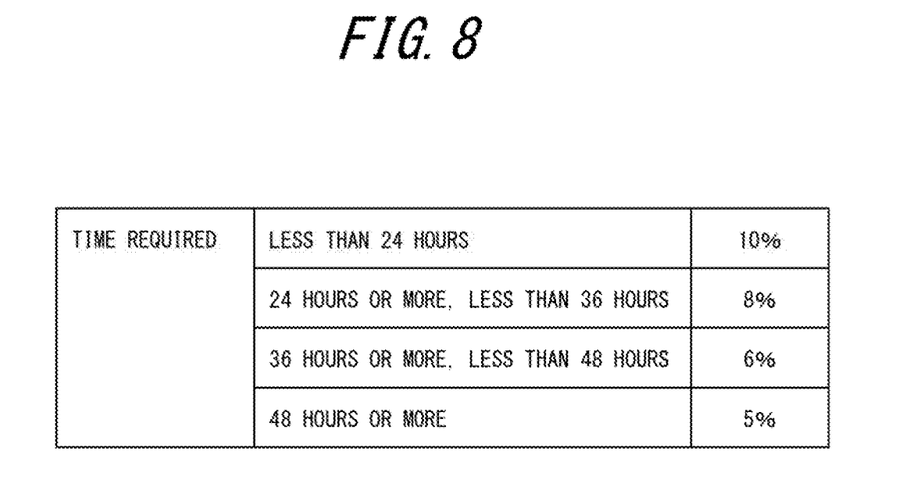
FIG. 8 illustrates examples of exhibition fees.

FIG. 8 illustrates examples of exhibition fees determined by the server apparatus 10. In FIG. 8, the exhibition fee is indicated as a percentage relative to the price of an exhibited product. In this example, when the time required is less than twenty four hours, the exhibition fee is determined to be 10% of the exhibited price. When the time required is twenty four hours or more but less than thirty six hours, the exhibition fee is determined to be 8% of the exhibited price. When the time required is thirty six hours or more but less than forty eight hours, the exhibition fee is determined to be 6% of the exhibited price. When the time required is forty eight hours or more, the exhibition fee is determined to be 5% of the exhibited price. Various types of exhibition fees, other than the examples provided here, can be set as appropriate. For example, the exhibition fee and the range of increase or decrease can be determined as a monetary amount rather than percentage.

Figure 9:
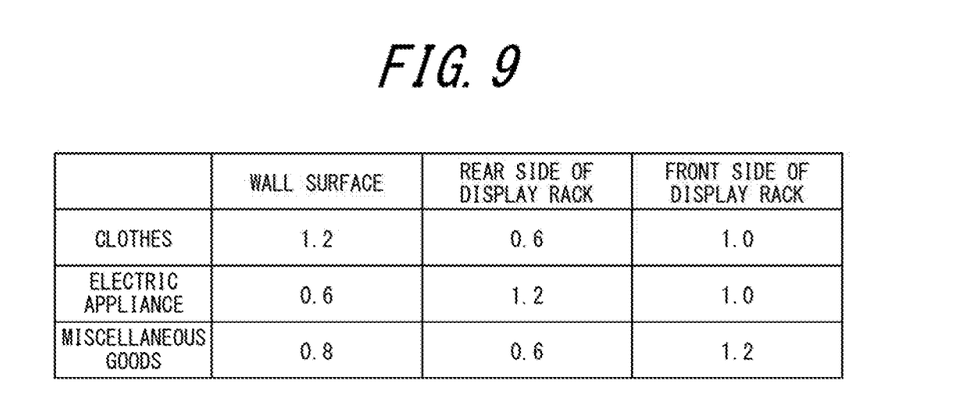
FIG. 9 illustrates examples of exhibition fees in a modified example.

FIG. 9 illustrates an example of determining exhibition fees in a modified example. FIG. 9 illustrates an example in which the exhibition fee differs depending on a combination of the type of an exhibited product and a position of a display position. Depending on the type of a product, the display style may affect the sale tendency such that the product is easily seen, is seen as attractive, or is easily picked up. FIG. 9 illustrates an example in which such heuristics are reflected in the exhibition fees. FIG. 9 illustrates exemplary coefficients to be applied to the exhibition fees illustrated in FIG. 8 for cases in which products such as clothes, home electric appliances, and miscellaneous goods are displayed on a wall surface, a rear side of a display rack, a front side of a display rack, and the like, respectively. For example, in cases in which the time required for sale of clothes at each of the display positions is shorter in the order of the wall surface, the front side of the display rack, and the rear side of the display rack, the exhibition fee determined according to FIG. 8 is multiplied by a coefficient of 1.2, 1.0, or 0.6, respectively. Meanwhile, in cases in which the time required for sale of a home electric appliance at each of the display positions is shorter in the order of the rear side of the display rack, the front side of the display rack, and the wall surface, the exhibition fee determined according to FIG. 8 is multiplied by a coefficient of 1.2, 1.0, or 0.6, respectively. In cases in which the time required for sale of miscellaneous goods at each of the display positions is shorter in the order of the front side of the display rack, the wall surface, and the rear side of the display rack, the exhibition fee is multiplied by a coefficient of 1.2, 0.8, or 0.6, respectively. Note that various types of exhibition fees, other than the examples provided here, can be set as appropriate. For example, the range of increase or decrease may be determined to be a monetary amount rather than a coefficient.

In this modified example, when the server apparatus 10 receives an exhibition request from the exhibitor terminal apparatus 11 (FIG. 5: step S500) for example, the server apparatus 10 determines the type of the exhibited product based on product information, and informs the exhibitor terminal apparatus 11 of the exhibition fee of the available display position corresponding to the type (FIG. 5: step S502). In this way, it is possible to determine the exhibition fee by taking into account the turnover of the product due to compatibility between the product type and the display position.

As described above, by setting the exhibition fee for a display position where the product turnover is high to be higher and setting the exhibition fee for a display position where the product turnover is low to be lower, or by taking into account the compatibility between the product type and the display position additionally, it is possible to efficiently increase the exhibition fee income of the marketplace service provider. It is also possible to provide a feeling of satisfaction to the exhibitor in that although the exhibition fee is higher, sale of the product can be achieved quickly, whereas when the exhibition fee is lower, sale of the product takes longer.

The server apparatus 10 performs determination and updating of the exhibition fee in step S528 at any appropriate timing. The server apparatus 10 may determine and update the exhibition fee each time one or a predetermined number of products are sold, or when the mobile shop 13 ends traveling for a scheduled traveling sales route. Alternatively, the server apparatus 10 may determine and update the exhibition fee periodically according to a predetermined time period (several hours to several days).

Figure 10A:
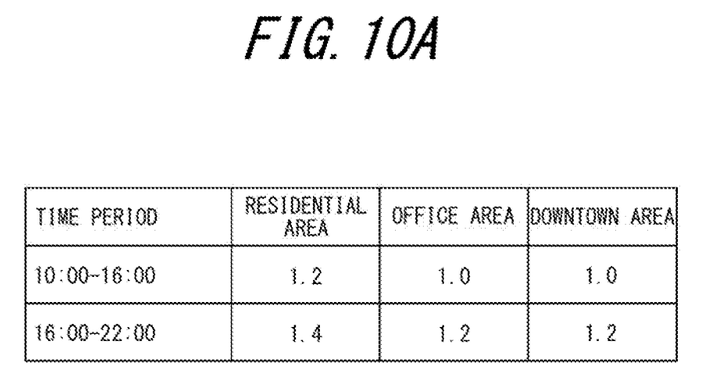
FIG. 10A illustrates examples of exhibition fees in a modified example.
Figure 10B:
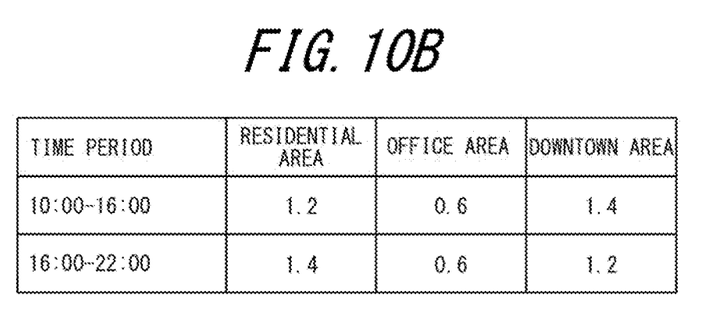
FIG. 10B illustrates examples of exhibition fees in a modified example.

FIGS. 10A and 10B illustrate another modified example of determining an exhibition fee by the server apparatus 10. FIGS. 10A and 10B illustrate examples in which exhibition fees differ depending on combinations of an exhibition time period and routes on which traveling sales by the mobile shop 13 are performed. FIGS. 10A and 10B illustrate exemplary coefficients to be applied to the exhibition fees defined in FIG. 8 corresponding to combinations of the exhibition time period and the route, in which FIG. 10A illustrate a weekday case and FIG. 10B illustrates a weekend case. The route is indicated by the surrounding characteristic environment. That is, a "residential area" route is a route mainly passing through a residential area. A "business area" route is a route mainly passing through a business area. A "downtown area" route is a route mainly passing through a downtown area. For example, as illustrated in FIG. 10A, in a time period from 10:00 to 16:00 on weekdays, since purchase by housewives and househusbands is expected when traveling sales is performed in the residential area, the exhibition fee is multiplied by a coefficient of 1.2. On the other hand, since it is expected that customers are fewer in the business area and in the downtown area, the exhibition fee is multiplied by a coefficient of 0.8. In an exhibition time period from 16:00 to 22:00 on weekdays, since purchase by business persons who are on his/her way home is expected in the residential area and in the business area, the exhibition fee is multiplied by a coefficient of 1.4, while since purchase by diners after work is expected in the downtown area to some extent, the exhibition fee is multiplied by a coefficient of 1.2. Moreover, as illustrated in FIG. 10B, in a time period from 10:00 to 16:00 on weekends, since purchase by those who stayed home is expected in the residential area, the exhibition fee is multiplied by a coefficient of 1.2. On the other hand, since it is expected that the business area is inactive and customers are fewer, the exhibition fee is multiplied by a coefficient of 0.6, while since customers such as weekend shoppers may be expected in the downtown area, the exhibition fee is multiplied by a coefficient of 1.4. Then, in an exhibition time period from 16:00 to 22:00 on weekends, since customers who went out in the morning and are on their way home are expected in the residential area, the exhibition fee is multiplied by a coefficient of 1.4, while it is expected that the business area is further inactive and customers are fewer, the exhibition fee is multiplied by a coefficient of 0.5, and since purchase by shoppers on their way home is expected in the downtown area, the exhibition fee is multiplied by a coefficient of 1.2.

In this modified example, for example, when the server apparatus 10 receives an exhibition request from the exhibitor terminal apparatus 11 (FIG. 5: step S500), the server apparatus 10 determines, based on that point of time, an exhibition time period in which traveling sales is to be scheduled after collection of the exhibited product. The server apparatus 10 also specifies the route of the mobile shop 13 nearest to the collection point and an available display position in the mobile shop 13. Then, the server apparatus 10 determines the exhibition fee by multiplying the exhibition fee for the available display position by a coefficient corresponding to the combination of the specified exhibition time period and the route of the mobile shop 13. Then, the server apparatus 10 informs the exhibitor terminal apparatus 11 of the determined exhibition fee (FIG. 5: step S502). If it is expected that the traveling sales is performed over different exhibition time periods, the server apparatus 10 may specify an exhibition time period by selecting an earlier or later exhibition time period in accordance with a rule predetermined as appropriate or selecting an exhibition time period in which traveling sales is performed longer, and obtain a coefficient corresponding to the specified exhibition time period and the route. Alternatively, the server apparatus 10 may determine the exhibition fee not only for the nearest mobile shop 13 but also for each of a plurality of mobile shops 13 located within a predetermined distance range and having different routes, inform the exhibitor terminal apparatus 11 of combinations of the routes and the exhibition fees, and urge the exhibitor to select exhibition on the desired route.

According to such a modified example, by taking into account factors such as the time period and the route of traveling sales, in addition to differences in the product turnover depending on the display position, it is possible to set an exhibition fee on which sale of product is reflected more precisely.

The embodiment described above has illustrated the case in which the entire processing for detecting exhibition and removal of a product, based on a temporal change in the captured images of the display position in the mobile shop 13, is performed by the server apparatus 10, as an example. However, some or all of such processing may be performed by the controller 56 of the mobile shop 13, and the server apparatus 10 may receive a detection result.

In the embodiment described above, a processing/control program that defines operation of the controller 33 of the exhibitor terminal apparatus 11 may be stored in a memory of the server apparatus 10 or another server apparatus and downloaded to each terminal apparatus via the network 15, or may be stored on a portable recording/storage medium readable by each terminal apparatus and read from such a medium by each terminal apparatus. Further, a processing/control program that defines operation of the controller 56 of the mobile shop 13 may be stored in a memory of the server apparatus 10 or another server apparatus and downloaded to the controller 56 of the mobile shop 13 via the network 15, or may be stored on a portable recording/storage medium readable by the controller 56 and read from such a medium by the controller 56.

While an embodiment has been described above based on the drawings and examples, it should be noted by those skilled in the art that various modifications and revisions can be easily made based on the present disclosure. Therefore, it should be noted that those modifications and revisions are included in the scope of the present disclosure. For example, the functions and the like included in the respective means and respective steps and the like can be rearranged so as not to contradict logically, and a plurality of means, steps, and the like can be combined into one or they can be divided.

The invention claimed is:

1. A server apparatus comprising:
   a memory configured to store an exhibition fee for exhibiting a product at a mobile shop having a camera and a display position for the product to be placed, the mobile shop further configured to control the camera and to obtain position information;
   a communication interface configured to:
      transmit exhibitor information to a terminal apparatus of an exhibitor, wherein the exhibitor information includes the exhibition fee for exhibiting the product at the display position of the mobile shop,
      receive sequentially captured images, from the camera of the mobile shop, which include the display position in the mobile shop at which the product is displayed, and
      receive from the terminal apparatus of the exhibitor information indicating a collection point where the product is to be collected; and
   a controller configured to:
      after receiving acceptance of the exhibition fee from the terminal apparatus of the exhibitor, transmit an instruction to the mobile shop to cause the mobile shop to move to the collection point for collecting the product to be exhibited at the display position of the mobile shop,
      after the exhibited product is disposed at the display position of the mobile shop, detect whether the exhibited product has been sold based on the sequentially received captured images showing that the exhibited product has been removed from the display position,
      obtain a time required until sale of the exhibited product located at the display position based on a temporal change in the sequentially captured images of the display position from a time when the exhibited product is shown at the display position until the time when the exhibited product is removed from the display position,
      update the exhibition fee for the display position based on the time required for the sale,
      in response to a subsequent request from the exhibitor to exhibit another product, transmit the updated exhibition fee for the display position to the terminal apparatus of the exhibitor.

2. The server apparatus according to claim 1, wherein when the controller receives the acceptance of the exhibition fee from the terminal apparatus of the exhibitor, the controller performs processing to charge the exhibition fee to a financial account of the exhibitor.

3. The server apparatus according to claim 1, wherein the controller is further configured to determine the exhibition fee by taking into account a route of a mobile shop which has the display position.

4. The server apparatus according to claim 1, wherein the controller is further configured to determine the exhibition fee by taking into account a type of the product to be displayed at the display position.

5. The server apparatus according to claim 1, wherein the controller is further configured to determine the exhibition fee by taking into account an exhibition time period for the product.

6. The server apparatus according to claim 1, wherein the controller is configured to determine the exhibition fee for each of a plurality of display positions.

7. An information processing system comprising the server apparatus and the terminal apparatus according to claim 1.

8. A non-transitory storage medium readable by one or more processors, the non-transitory storage medium storing a program which, when executed by the one or more processors, causes the one or more processors to:
   store an exhibition fee for exhibiting a product at a mobile shop having a camera and a display position for the product to be placed, the mobile shop further configured to control the camera and to obtain position information;
   transmit exhibitor information to a terminal apparatus of an exhibitor, wherein the exhibitor information includes the exhibition fee for exhibiting the product at the display position of the mobile shop;
   receive sequentially captured images, from the camera of the mobile shop, which include the display position in the mobile shop at which the product is displayed;
   receive from the terminal apparatus of the exhibitor information indicating a collection point where the product is to be collected;
   after receiving acceptance of the exhibition fee from the terminal apparatus of the exhibitor, transmit an instruction to the mobile shop to cause the mobile shop to move to the collection point for collecting the product to be exhibited at the display position of the mobile shop;
   after the exhibited product is disposed at the display position of the mobile shop, detect whether the exhibited product has been sold based on the sequentially received captured images showing that the exhibited product has been removed from the display position;
   obtain a time required until sale of the exhibited product located at the display position based on a temporal change in the sequentially captured images of the display position from a time when the exhibited product is shown at the display position until the time when the exhibited product is removed from the display position;
   update the exhibition fee for the display position based on the time required for the sale, in response to a subsequent request from the exhibitor to exhibit another product, transmit the updated exhibition fee for the display position to the terminal apparatus of the exhibitor.

9. The non-transitory storage medium according to claim 8, wherein
the terminal apparatus, in response to an operation by the exhibitor, transmits an acceptance of the exhibition fee to the server apparatus, and processing for charging the exhibition fee to a financial account of the exhibitor is performed by the server.

10. The non-transitory storage medium according to claim 9, wherein
the exhibition fee is further determined by the server apparatus by taking into account a route of a mobile shop which has the display position.

11. The non-transitory storage medium according to claim 8, wherein
the exhibition fee is further determined by the server apparatus by taking into account a type of the product to be displayed at the display position.

12. The non-transitory storage medium according to claim 8, wherein
the exhibition fee is further determined by the server apparatus by taking into account an exhibition time period for the product.

13. The non-transitory storage medium according to claim 8, wherein
the server apparatus determines the exhibition fee for each of a plurality of display positions.

14. A non-transitory storage medium readable by a controller of a mobile shop, the mobile shop including a communication interface, a camera, a controller configured to transmit and receive information that includes (i) a position information with another apparatus via the communication interface, and (ii) a display position where a product is displayed until the product is sold, the non-transitory storage medium storing a program which, when executed by the controller of the mobile shop, causes the mobile shop to:
upon receipt of an instruction from a server apparatus, which receives from a terminal apparatus of an exhibitor acceptance of an exhibition fee for exhibiting the product at the display position of the mobile shop and information indicating a collection point where the product is to be collected, move to the collection point for collection of the product at the collection point transmitted after the server apparatus receives an exhibition request regarding collection of the product at the collection point;
sequentially capture images from the camera which include the display position in the mobile shop at which the exhibited product is displayed;
transmit the sequentially captured images of the display position to the server apparatus that obtains a time required until sale of the exhibited product at the display position based on a temporal change in the sequentially captured images of the display position from a time when the exhibited product is shown at the display position until the time when the exhibited product is removed from the display position;
wherein the exhibition fee is updated for the display position based on the time required for the sale; and
in response to a subsequent request from the exhibitor to exhibit a second product for the updated exhibition fee, move to the collection point to collect the second product to be exhibited.

15. The non-transitory storage medium according to claim 14, wherein
the exhibition fee is further determined by the server apparatus by taking into account a route of the mobile shop.

16. A mobile shop comprising a controller configured to perform the operations according to claim 14.

17. A method of operating an information processing system, the information processing system including a server apparatus, a mobile shop configured to transmit and receive information to and from the server apparatus, and a terminal apparatus of an exhibitor, the method comprising:
storing an exhibition fee for exhibiting a product at a display position of the mobile shop having a camera and a display position for the product to be placed, the mobile shop further configured to control the camera and to obtain position information;
the server transmitting exhibitor information to the terminal apparatus of the exhibitor, wherein the exhibitor information includes the exhibition fee for exhibiting the product at the display position of the mobile shop;
the server receiving sequentially captured images, from the camera of the mobile shop, which include the display position in the mobile shop at which the product is displayed, and
the server receiving from the terminal apparatus of the exhibitor information indicating a collection point where the product is to be collected;
the terminal apparatus transmitting an acceptance of the exhibition fee to the server apparatus in response to an operation by the exhibitor;
after receiving information indicating the collection point where the product is to be collected and acceptance of the exhibition fee from the terminal apparatus of the exhibitor, the server transmitting an instruction to the mobile shop to cause the mobile shop to move to the collection point for collecting the product to be exhibited at the display position of the mobile shop,
after the exhibited product is disposed at the display position of the mobile shop, the server detecting whether the exhibited product has been sold based on the sequentially received captured images showing that the exhibited product has been removed from the display position,
the server obtaining a time required until sale of the exhibited product located at the display position based on a temporal change in the sequentially captured images of the display position from a time when the exhibited product is shown at the display position until the time when the exhibited product is removed from the display position,
the server updating the exhibition fee for the display position based on the time required for the sale, and
in response to a subsequent request from the exhibitor to exhibit another product, the server transmitting the updated exhibition fee for the display position to the terminal apparatus of the exhibitor.

* * * * *